(No Model.) 6 Sheets—Sheet 1.

P. B. DELANY & E. A. CALAHAN.
PRINTING TELEGRAPH FOR SYNCHRONOUS TELEGRAPHY.

No. 322,693. Patented July 21, 1885.

WITNESSES
Wm A. Skinkle
H. W. Elmore

INVENTORS
Patrick B. Delany
Edward A. Calahan

By their Attorneys
Baldwin, Hopkins & Peyton (No Model.) 6 Sheets—Sheet 2.

P. B. DELANY & E. A. CALAHAN.
PRINTING TELEGRAPH FOR SYNCHRONOUS TELEGRAPHY.

No. 322,693. Patented July 21, 1885.

WITNESSES
Wm A. Skinkle
H. W. Elmore

INVENTORS
Patrick B. Delany.
Edward A. Calahan.
By their Attorneys,
Baldwin, Hopkins & Peyton (No Model.) 6 Sheets—Sheet 3.
P. B. DELANY & E. A. CALAHAN.
PRINTING TELEGRAPH FOR SYNCHRONOUS TELEGRAPHY.
No. 322,693. Patented July 21, 1885.
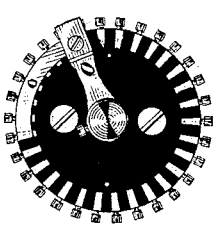
Fig. 6.
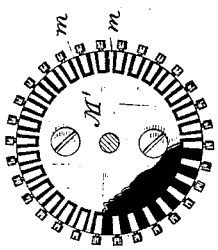
Fig. 6.¹
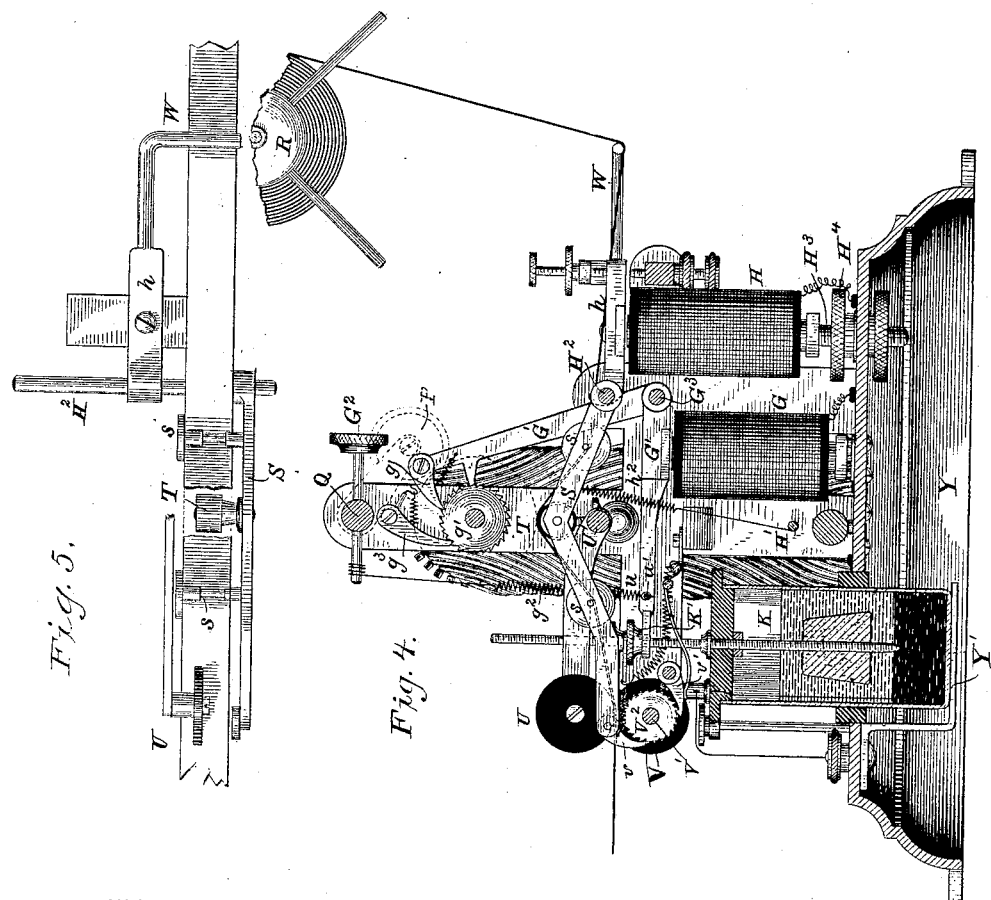
WITNESSES
Wm A. Skinkle
H. W. Elmore
INVENTORS
Patrick B. Delaney.
Edward A. Calahan
By their Attorneys,
Baldwin, Hopkins & Peyton (No Model.)  6 Sheets—Sheet 4.
P. B. DELANY & E. A. CALAHAN.
PRINTING TELEGRAPH FOR SYNCHRONOUS TELEGRAPHY.
No. 322,693. Patented July 21, 1885.
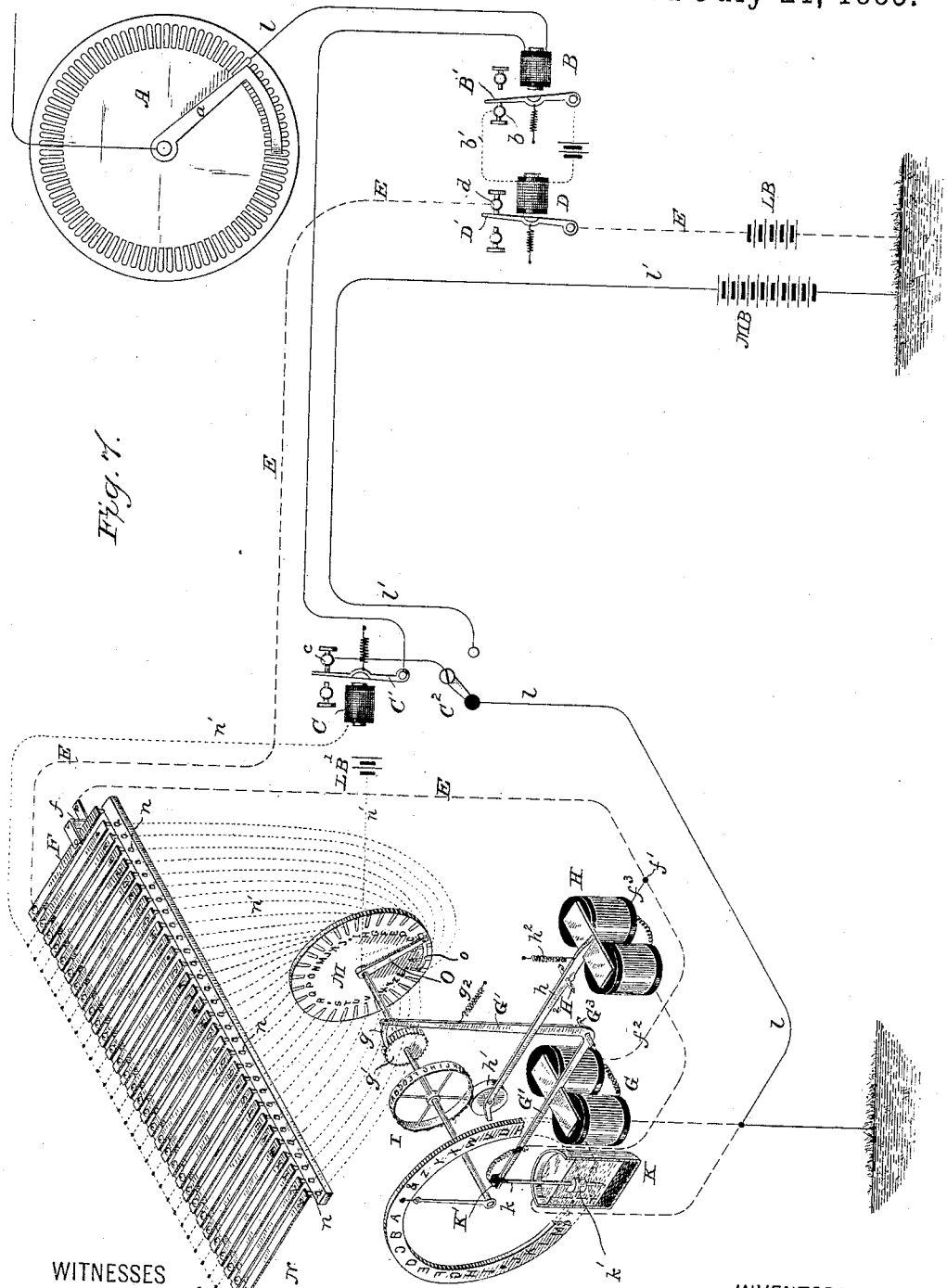
WITNESSES
Wm. A. Skinkle
Geo. W. Young
INVENTORS
Patrick B. Delany.
Edward A. Calahan.
By their Attorneys
Baldwin, Hopkins & Peyton

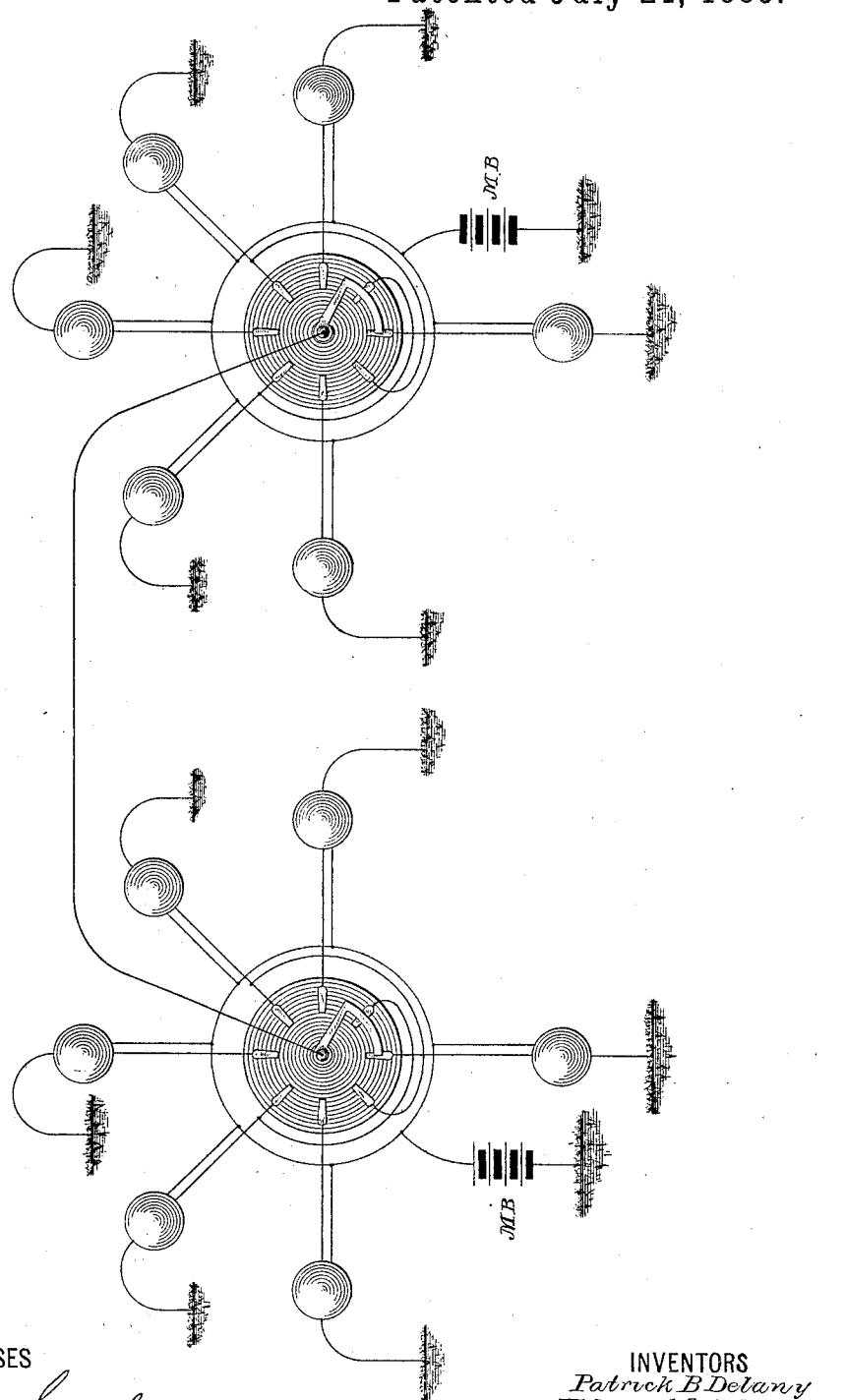

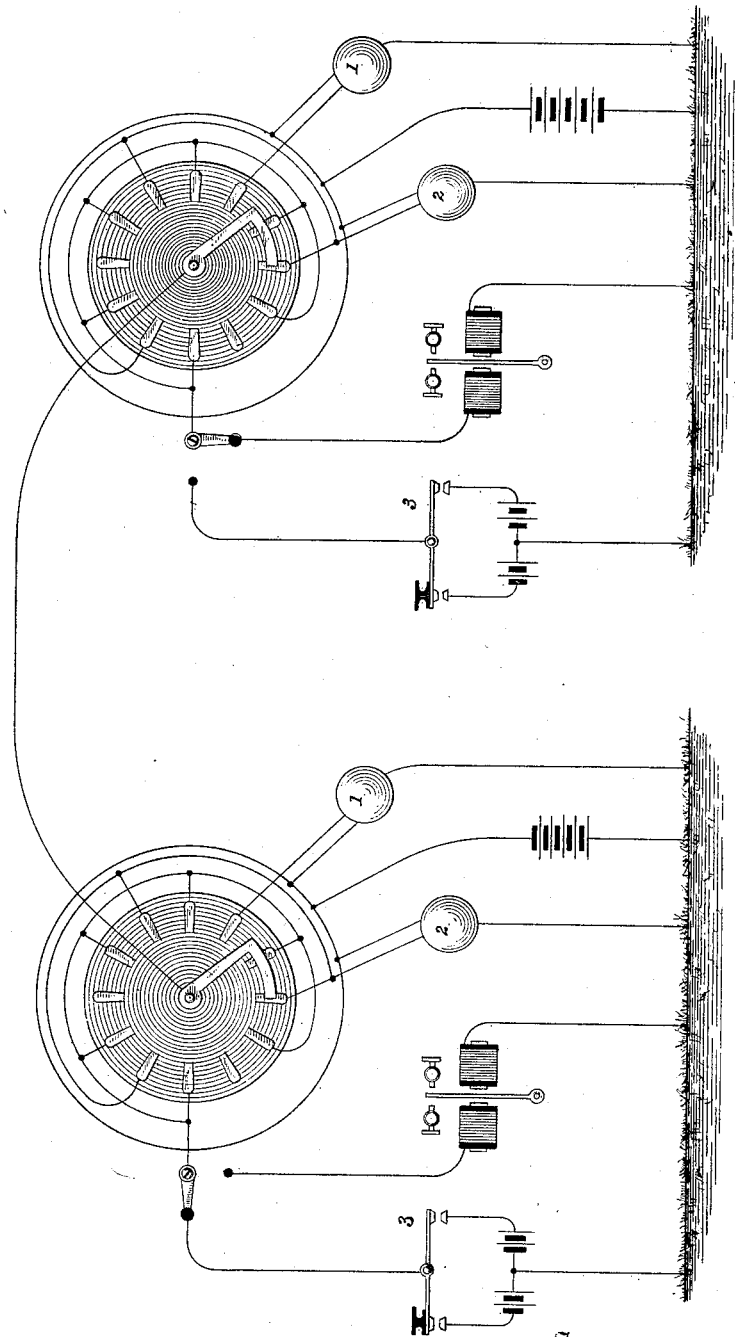

UNITED STATES PATENT OFFICE.

PATRICK B. DELANY, OF NEW YORK, AND EDWARD A. CALAHAN, OF BROOKLYN, ASSIGNORS TO THE STANDARD MULTIPLEX TELEGRAPH COMPANY, OF NEW YORK, N. Y.

PRINTING-TELEGRAPH FOR SYNCHRONOUS TELEGRAPHY.

SPECIFICATION forming part of Letters Patent No. 322,693, dated July 21, 1885.

Application filed April 19, 1884. Renewed March 31, 1885. (No model.)

*To all whom it may concern:*

Be it known that we, PATRICK B. DELANY and EDWARD A. CALAHAN, residing, respectively, in the city, county, and State of New York, and in Brooklyn, in the county of Kings and State of New York, jointly have invented certain new and useful Improvements in Telegraphy, of which the following is a specification.

In Letters Patent of the United States granted to P. B. Delany, October 9, 1883, there is shown a system of synchronous movements adapted to the multiplex telegraphic transmission of messages.

Our present invention relates to a certain organization of apparatus by which printing instruments may be practically used in such a system of synchronous telegraphy. We do not, however, confine our present invention to the particular organizations for synchronous motion disclosed in the above-mentioned Letters Patent, as obviously any other system by which practically perfect synchronism may be obtained may be used in connection with our present improvements.

In an application for Letters Patent of the United States, filed by P. B. Delany, October 24, 1883, serially numbered 109,916, he has shown and described printing-instruments connected with synchronously-actuated apparatus at each end of a main line for the synchronous multiplex transmission of messages, and no claim is made, broadly, to such subject-matter herein.

Figure 1:
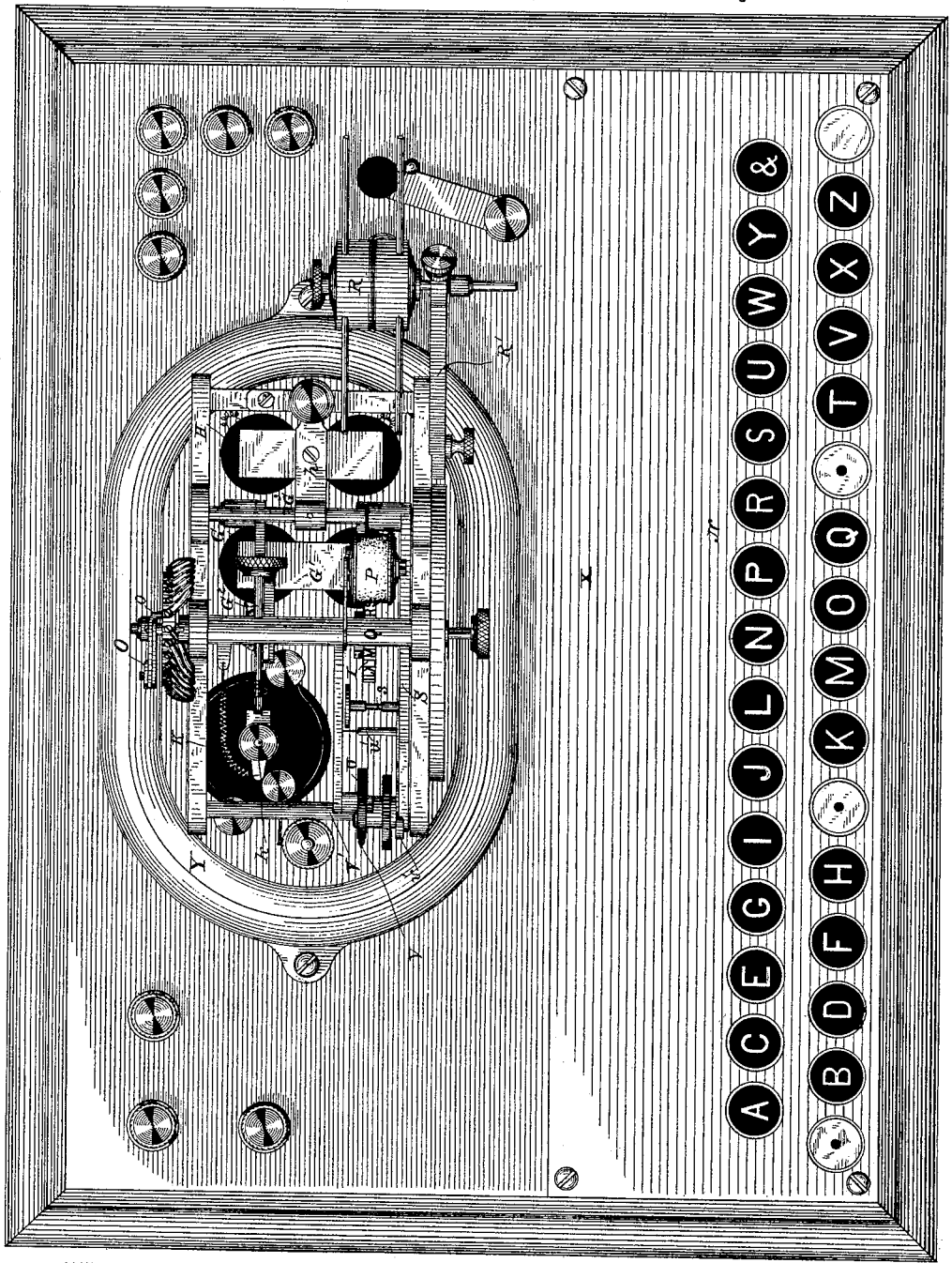
Figure 3:
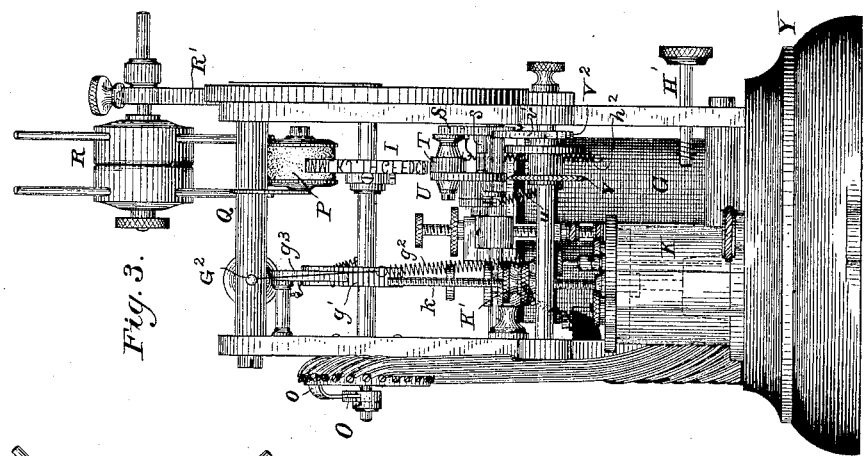
Figure 2:
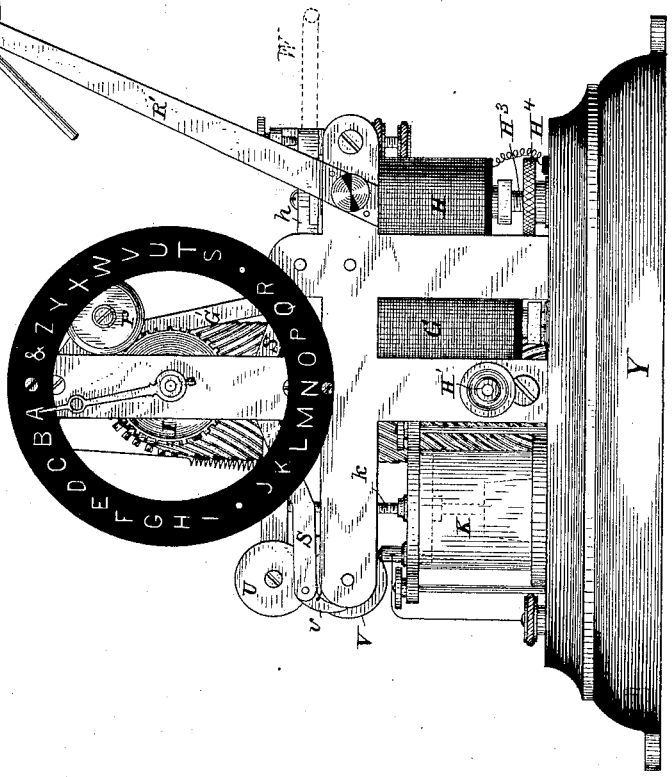

In the accompanying drawings, Figure 1 is a plan view of our improved printing-instrument. Fig. 2 is a front elevation; Fig. 3, an end elevation. Fig. 4 is a front sectional elevation. Fig. 5 is a detail view of the devices for carrying the paper strip. Figs. 6 and 6' are detail views of the sunflower or the wheel with which the various letter-circuits are connected. Fig. 7 is a perspective and diagrammatic view illustrating the leading features of the organization in connection with a contact-table of a synchronously-actuated apparatus. Fig. 8 is a diagram view illustrating a number of stations connected with a synchronously-actuated apparatus at each end of a main line; and Fig. 9 is a diagram view illustrating several different kinds of circuits worked on a single main line.

In Fig. 7, A represents the circular table of contacts of a synchronous apparatus which is to be placed at each end of the main line. Trailing fingers or circuit-completers $a$ in electrical connection with the main line traverse the contacts on the tables. These fingers may be synchronously actuated in the manner set forth in the patents above mentioned.

We have shown eighty-four contacts arranged on the table. Twelve of these may be used, as described, in the patents for maintaining the synchronous rotation of the fingers. The remaining seventy-two contacts may be distributed for telegraphic transmission. Each of said seventy-two contacts at each station may be connected with printing-instruments so that there will be seventy-two independent transmitting-circuits on one wire; and the operator at the instruments connected to a given contact at one end of main line will be in independent communication with the operator at the instruments connected to the corresponding contact at the other end of the line.

Referring to Fig. 7, the group of instruments there represented is connected with one of the contacts on the table A, and its corresponding instrument at the other end of the line is connected with the corresponding contact. If, now, the trailing fingers at the stations be rotated synchronously, it is obvious that these corresponding contacts will be placed in communication once in each revolution of the fingers. This momentary completion of the circuit from the instrument at one end of the line to the corresponding instrument at the other end of the line may be utilized for the transmission of intelligence as follows:

The organization at both stations is exactly the same, and therefore a description of one end of the line will be sufficient. The line $l$ from the contact on the table A passes through the coils of a relay-magnet, B, thence to an armature, C', thence by back-stop $c$ to a switch, $C^2$, and from thence either to the ground through line $l$, when the switch is in the position indicated in the drawings, which is the position for reception, or through the line $l'$ to a battery, M B, which is the position for transmission. At the distant station we will assume that the switch $C^2$ is on the opposite contact from that shown in the drawings, so that at that station the battery M B is connected to the back-stop $c$, armature $C'$, relay B, and line $l$ with the contact on the table A. Whenever, therefore, the fingers at the two stations rest simultaneously on the corresponding contacts with which the lines $l$ are connected, an impulse of electricity will be transmitted from the distant station over the main line and through the finger $a$ into the line $l$ at the receiving station, and the parts of the apparatus being in the position indicated in Fig. 7 the circuit is completed to the ground. This impulse therefore momentarily energizes the magnet B, which attracts its armature B' from its back-stop $b$ and breaks a local circuit, $b'$. This local circuit passes through the coils of an electro-magnet, D, and when the circuit is broken the magnet D releases its armature D', which leaves its front contact-stop, $d$, and breaks a circuit which is marked E. This latter circuit is shown by the broken line, and runs from a battery, L B, through the armature D' of the magnet D and contact-stop $d$ to a key, F, on the key-board of the instrument, which is normally held in contact with its upper contact-bracket, $f$. From thence the circuit passes to the point $f'$, where it divides into two branches. One branch (marked $f^2$) passes through the coils of a magnet, G, and thence to ground. Therefore, at each actuation of the armature B' of the relay B the magnet G is demagnetized and magnetized, and is caused to act upon its right-angled or elbow armature G'. The vertical arm of this armature carries a push-pawl, $g$, which engages with a ratchet-wheel, $g'$, on the type-wheel shaft and rotates the type-wheel I one step or letter for each actuation of the armature. This latter construction is common and well known in printing-telegraphs. The horizontal arm of the armature G' is bifurcated or slotted at the end for the reception of a plunger, $k$, which is supported in the end of said arm by an adjusting-nut, K', which works on the threaded plunger-rod. This plunger works in a cup. K, which contains in its bottom a quantity of mercury, on top of which is placed a quantity of glycerine. The rod $k$ carries a float, $k'$, which is submerged in the glycerine. This float may be of any suitable buoyant or semi-buoyant material; or a thin metal disk might be used, as any device which retards the descent of the plunger sufficiently may be employed. The height of the mercury in the cup is so proportioned relatively to the extent of vertical movement of the rod $k$ that when the armature G' is drawn down by the magnet G for a suitable interval of time the plunger $k$ will have sufficient time to sink through the glycerine, so that its sharpened end will make contact with the mercury in the bottom of the cup; but when the armature G' is caused to vibrate comparatively rapidly up and down the plunger $k$ does not have time to sink into contact with the mercury. The purpose of this arrangement will be presently described. The other branch, $f^3$, of the circuit E, which divides at the point $f'$, passes through the coils of the printing-magnet H, and thence to a delicate spiral of wire, which is connected with the plunger $k$. The mercury in the bottom of the cup K is connected with a continuation of the circuit $f^3$, which passes from thence to ground, as clearly shown in the drawings. It will be obvious, therefore, that when the plunger is allowed to settle in the glycerine, so that its end comes in contact with the mercury, the branch circuit $f^3$ will be completed and the printing-magnet will be energized, so that its armature $h$ will be drawn down and the receiving-strip of paper which traverses over the roller $h'$ on the extended end of the armature will be thrown up against the type-wheel, and a sign or letter will be printed.

The essential parts of the apparatus for printing and obtaining the step-by-step movement at the receiving-station having now been described, we will describe the arrangement for transmission. The apparatus at the distant station is identical with that illustrated in Fig. 7. At the transmitting-station the switch $C^2$ is put over so that the line $l'$ containing the main battery M B is sent to line through the relay B. As long as the trailing fingers at the two stations are not on the contacts with which the instruments being described are connected, the circuit from the main battery M B at the distant station to the earth, at the receiving station, shown in Fig. 7, will be open; but when the fingers come upon the corresponding contacts the circuit from the main battery M B at the distant station will be completed; and as the line $l$ at the distant station passes through a relay, B, precisely as it does at the receiving-station, those relays will be simultaneously energized and their armatures B' will be drawn away from their back-stops, the local $b'$ at each station will be interrupted, and the armature D' will leave its front-stop, thus breaking the local circuit E simultaneously at these stations. The result of this at both stations is that the armature $h$ of the printing-magnet H is drawn away from the magnet by its spring, and the armature G' of the actuating-magnet G is drawn away from its magnet by its spring. The armature G' in its movement away from its magnet draws back the pawl $g$ for engagement with the next ratchet in the wheel $g'$, and also throws up the horizontal arm of the armature, so as to throw the plunger up out of contact with the mercury. As soon as the trailing fingers at the two stations pass off of the corresponding contacts the main-line circuit will be broken again, the circuit E, through its branch $f^2$, will be completed again, the actuating-armature G' will be drawn down by its magnet, and the instruments at each station will therefore be caused to move forward one step. The plunger $k$, however, will not immediately settle into contact with the mercury in the bottom of the cup K, and therefore the branch $f^3$ of the circuit E will not be completed so as to actuate the print-magnet until a sensible interval of time sufficient to permit the plunger to sink into contact with the mercury has elapsed. If, therefore, the rotation of the trailing fingers at the two stations is such that the completions of the main-line circuit occur with sufficient rapidity, the instruments at the two stations will be carried forward together step by step without actuating the print-lever at either station. In practice we cause the rotating trailing fingers at the stations to rotate about three times a second, as fully described in the patents before mentioned, so that three impulses of electricity, such as above described, will pass over the main line in each second, and the lazy device $k$ is so regulated as not to complete the branch $f^3$ of the circuit E when this number of impulses per second is received. If, now, in transmitting, one or more of the impulses in each second be eliminated or prevented from entering the main line, the type-wheel at each station will remain at rest during that time; but the plunger $k$ will have sunk into contact with the mercury in the cup K, the branch circuit $f^3$, which passes through the coils of the print-magnet H at each station, will be completed, and the print lever or armature $h$, which carries the paper-roller or platen $h'$, will throw the paper up against the type-wheel and print the same letter at each station.

I will now describe the arrangement for thus transmitting the letters. At the end of the type-wheel shaft is what is termed a "sunflower," M, which is a stationary disk in which the shaft may have its bearing. The disk carries a series of insulated contacts arranged in a circular series around the disk, which contacts correspond with the transmitting-keys of the instrument, not including the key F, hereinbefore mentioned. These contacts are each independently connected with insulated bottom contact-stops, $n$, of the transmitting-keys N of the instrument. The keys, except F, are normally held out of contact with their stops $n$, and each of said keys is connected with one pole of a local battery, L B', in a local circuit, (indicated by the dotted line and marked $n'$.) A radial arm, O, on the type-wheel shaft carries a trailing finger, $o$, which traverses the insulated contacts on the sunflower as the type-wheel shaft revolves, and this radial arm is connected with the opposite pole of the local battery L B'. A magnet, C, in the local circuit $n'$ acts upon the armature C', through which the circuit $l$ is completed, either to the earth for reception or to the battery M B for transmission, as described. If, now, at the transmitting-station, where the switch C² is put over, so as to throw the battery M B into circuit, it is desired to print a given letter, the key marked with that letter is depressed, and the apparatus at each station comes around step by step until the letter desired to be printed is reached, when the finger $o$ on the radial arm O will come upon the contact corresponding with the letter desired to be printed, and will complete the local circuit $n'$, so that the magnet C is energized and the armature C' drawn from its back-stop, so as to break the main circuit $l\ l'$. If the apparatus be maintained now in this condition a sufficient length of time to prevent one or more of the regular impulses from the battery M B from passing into the line, the branch circuit $f^3$ will be completed between the plunger and the mercury in the cup K, as already described, the print-magnet will be energized, and the paper thrown up against the type-wheel to print the desired letter, and, as already described, this will occur at both stations, so that a copy of the message sent will be printed both at the sending and the receiving station. When the finger is lifted from the key, the regular impulses are sent into the line, and the apparatus at each station is again carried forward step by step until the letter corresponding with the next key that has been depressed is printed in like manner.

On the sunflower we have shown three keys and contacts, marked with a black dot. These are added for spacing the words, and the dots are printed in the same way as the letters. We also employ, for the convenience of the operator, a dial marked with the letters and signs to be transmitted, over which a pointer carried on the type-wheel shaft rotates. The space-dot between the A and the & may be considered the zero-point for both instruments, so that when the transmission of a message is commenced both instruments may start from a common zero-point.

The instruments may be readily independently rotated into proper position by working the key F, so as to break the circuit marked E.

It will be perceived that the local E of each instrument is normally closed through the armature of the relay D, key F, its contact $f$, and actuating-magnet to ground. The operator, therefore, by depressing the key so as to break contact between it and its bracket $f$, interrupts the local E, and a series of actuating-impulses may be imparted to the armature of the actuating-magnet. By thus locally breaking the circuit E, therefore, each instrument may be independently rotated to bring it into unison with the other.

Instead of having the instruments at both ends of the line permanently connected with the main line, switches may be provided for disconnecting them when the instruments are not in use. In this event, however, a call or signal instrument should be switched in at each station, so that when it is desired to transmit from one station to the other the receiving-station may be called up, so that the operator will put his instrument into proper position for reception.

In Fig. 7 we have shown the lettered keys arranged in a single row and reading from right to left. This is merely done for convenience of illustration, however, and to avoid confusion in showing the connections from the keys to the sunflower-contacts. The proper arrangement of the keys is shown in the plan view, Fig. 1.

Figs. 1, 2, 3, 4, 6 show the instrument, which is perspectively and diagrammatically represented in Fig. 7 fully organized.

The frame of the instrument is represented by the letter X, and the various parts described in connection with the diagram are lettered to correspond with the diagram.

The spring $h^2$ of the print-lever is adjusted by means of a thumb-nut and spindle, H', mounted in the framing, and the spring $g^2$ of the actuating-armature is adjusted in like manner by a nut and spindle, $G^2$.

$G^3$ is the pivot of the actuating-lever, and $H^2$ is the axis of the print-lever. The print-magnet is mounted upon a screw-threaded spindle, $H^3$, and is adjusted by means of thumb and check nuts $H^4$ toward or from the armature on the print-lever. The ratchet-wheel $g'$ is provided with an ordinary detent-pawl, $g^3$, as is usual.

The mercury-cup K may be made of glass, ebonite, or any suitable material, and is supported below the bed-plate Y of the instrument proper by a bracket, Y', secured on the under side of the hollow bed-plate.

The sunflower is shown in detail in Figs. 6 and 6', and is indicated as consisting of a disk of ebonite in which the contacts are embedded. Each contact is provided with a suitable screw for the connection of the circuit-wires.

Our particular construction of sunflower is indicated in Fig. 6'. The surface of the sunflower is covered with a plate, M', provided with radial teeth or projections $m$, which project between the insulated contacts, which are seated in a disk of some suitable insulating material, such as vulcanite. The teeth of the plate M', projecting between the contacts, approximately fill the space between said contacts, so that a substantially metal surface is presented, over which the trailing finger $o$ travels. The contacts are therefore not liable to be coated by particles of insulating material, which might be drawn or carried over on the contacts by the trailing finger if such material occupied the spaces between the contacts. By providing a substantially-continuous metal surface friction is also considerably reduced. The plate M' is seated on the insulating-disk of vulcanite, so that it is perfectly insulated. The insulated contacts and the teeth of the plate M' are preferably raised somewhat above the vulcanite surface.

P indicates an ordinary inking-roller, which is suspended by a bracket from the cross-shaft Q. The adjusting-spindle $G^2$ for the actuating-armature also has its bearings in this shaft.

The paper-drum R is carried on the end of an upwardly-inclined bar, R', and the strip of paper on which the message is to be printed is fed from the roll under the type-wheel in the following manner: The axis or rock-shaft $H^2$ of the printing-armature H is mounted in suitable bearings in the frame. It also carries the printing or paper-carrying frame S. (Shown particularly in Fig. 5.) The paper strip from the roller passes over the rock-shaft $H^2$ under a guide, $s$, which projects laterally from the frame S and is provided with a disk on its end for retaining the paper in place, thence over the platen-roller T, thence under another guide $s$, and thence between the friction feed-rollers U V. The roller V is mounted on a shaft, V', which carries a ratchet-wheel, $V^2$, which is acted on by a pawl, $v$, on the end of the print lever or frame, so that the pawl is rotated one tooth to feed the paper at each actuation of the print-lever. An ordinary detent pawl, $v'$, engages with the ratchet-wheel to prevent its reverse motion. The upper roller, U, is mounted on an arm which rocks on a spindle or arm, U', projecting from the frame. A spring, $u$, Fig. 3, normally draws the roller U down upon the roller V to grip the paper. This spring is connected with a small stud or arm, $u'$, projecting from the frame. (Shown in Fig. 1.) The paper is therefore fed forward at each actuation of the print frame or lever, and is prevented from being drawn back by the grip of these rollers. Instead, however, of drawing the paper under tension directly from the roller at each step in the feed, we provide means for taking a sufficient amount of slack from the roll of paper at each stroke of the printing-armature for the next feed. This we accomplish by means of a wiper, W, which is a light arm extending from the print-armature H, and is bent at right angles across the paper strip. When the print lever or frame is thrown up, therefore, to take an impression from the type-wheel, the wiper W is thrown down upon the paper, so as to cause it to unroll, thus leaving the paper strip slack to accommodate the next step of the feed. With such device the feeding of the paper is accomplished with accuracy and ease.

Many of the details of construction of the printer are well-known, and therefore need no more special description.

With an organization working on the principle herein described, in connection with any system by means of which a common main line may be distributed successively to a number of operators at the ends of the line, it will be obvious that the line is capable of subdivision to a far greater extent than has heretofore been accomplished.

In the arrangement illustrated and described there may be seventy-two independent circuits on one main line. Where a higher speed of transmission is desired, under the organization shown, the number of circuits will have to be reduced and the number of contacts for each circuit increased. In the latter case, if two contacts are used for one circuit, they are preferably opposite contacts in the circle, so that the actuating impulses will occur at regular intervals; and if more than two contacts are employed, they are preferably taken at equal intervals in the circle. Under our organization, therefore, some of the circuits may be worked by one contact, so that only one impulse in each revolution is given to the lines. Others may be worked by two or more impulses, so that several completions of the circuit will occur in each revolution of the apparatus.

We may also work one or more Morse circuits on the same wire in connection with the printing-circuits above mentioned. Such an organization is illustrated in the diagram view, Fig. 9, in which the stations marked 1 are connected in a printer-circuit having one impulse per revolution. The stations marked 2 are connected in another printer-circuit, having three contacts in the series, as clearly illustrated, and the stations marked 3 are connected for Morse transmission, as described in the patent of P. B. Delany, No. 286,278, granted to him October 9, 1883.

The Morse circuit is preferably provided with six contacts, taken at equal intervals in the circuit, so that the apparatus rotating, say, three times a second will give eighteen impulses or completions of the circuit per second, thus giving a current practically continuous for telegraphic purposes, as fully described in said patent. There may be several Morse circuits and several printer-circuits of different speeds, as may be desired.

In Letters Patent No. 286,273, granted October 9, 1883, to P. B. Delaney, one of these applicants, static discharge-contacts are shown arranged between the insulated contacts for the purpose of grounding the line after each momentary completion of the circuit.

Under our improved description, above described, it will be of course desirable to eliminate static and other disturbances from the line, and we of course contemplate doing so where it is necessary or desirable.

We have ascertained by practical experiment that a float device in connection with mercury and glycerine acts very efficiently to accomplish the purpose for which it is designed, and that other fluid than glycerine may be used. Any device, however, capable of performing the same function could obviously be used in connection with our invention—for instance, in the application of Delany, filed October 24, 1883, No. 109,916, he has shown an arrangement of disks, frictionally held in contact, for accomplishing the same result. Any arrangement, in fact, whereby the printing devices proper are actuated when more than the normal length of time between succeeding impulses of electricity has elapsed, would fulfill the function of this part of our invention; and our invention is not limited, in its broadest sense, to any particular device whereby this is accomplished.

In the diagram view, Fig. 8, we have illustrated two stations connected by a main line, with six sub-stations at each end of the line, All the sub-stations are connected with the same main battery M B. Independent batteries for each sub-station are entirely unnecessary, because the line is only in connection with one contact at a time. This figure gives a comprehensive view of the organization as a whole, though the number of sub-stations represented is very small. The main batteries M B are arranged, as shown, with opposite poles to the line, so that no reversals of polarity will occur in the relays B. This arrangement renders the magnets more sensitive to the impulses transmitted over the line.

Referring to the diagram view, Fig. 7, it will be observed that the impulses transmitted into the line are made effective at the stations when the armatures B' of the relays B leave their back-stops. Under this organization the working is distinct and accurate, because any uncertainty of motion of the armature after it had left its back-stop would not affect the instruments.

The details of the circuit-connections may be varied—for instance, the keys may work with a closed local, if desired—but such changes will be obvious to any electrician, and it would be useless to here attempt to recite the changes that might be made without departing from the spirit of the invention.

The scope of the invention and its application to the multiplex telegraphic transmission of messages whereby such marked advance is made in the art by means of which the capacity of a single conductor is so enormously increased are not limited to details of organization, the variation of which is within the skill of electrical engineers.

We claim as our invention—

1. The combination, substantially as set forth, of the transmitting-keys, their local circuits or branches of a circuit, the distributer or sunflower device, the actuating-magnet and actuating devices, the print-magnet and printing devices, a lazy device through which the circuit of the print-magnet is completed, and electric circuits and connections.

2. The combination, substantially as set forth, of the local battery L B, its circuit, the branches of the circuit, the actuating-magnet included in one of said branches; the print-magnet included in the other of said branches, a lazy device or tardy circuit-completer included in the same branch with the print-magnet, a main line, and devices for making and breaking the circuit of the local battery in response to periodic impulses of electricity received over the line.

3. The combination, substantially as set forth, of the local battery L B, its circuit, the unison key F and its contact, the actuating-magnet, its circuit, the print-magnet, its circuit, and a lazy device or tardy circuit-completer for completing the print-magnet circuit.

4. The combination, substantially as set forth, of the main line, the transmitting-keys, and sunflower, the local circuit of the keys, the magnet in the local circuit by which the main line is made and broken, local circuits or a split local circuit which is made and broken by the makes and breaks of the main line, the actuating-magnet included in one of said locals or branches, the print-magnet included in the other of said locals or branches, and a lazy device or tardy circuit-completer for completing the print-magnet circuit.

5. The combination, substantially as set forth, of a main line, a table of insulated contacts at each end of the main line, synchronously-actuated circuit-completing devices which traverse said tables of contacts, a main battery, and printing devices connected with one or more corresponding contacts at the stations, said printers consisting of the combination of transmitting-keys, their local circuits or branches of a circuit, the sunflower device, a magnet in the local circuit for interrupting the main line when one of the keys is operated, local circuits or a split circuit which is made and broken by the interruptions of the main line, the actuating-magnet included in one of said local circuits or branches, a print-magnet included in the other of said circuits or branches, and a lazy device or tardy circuit-completer for completing the print-magnet circuit.

6. The combination, substantially as set forth, of a main line, a main battery, a table of insulated contacts at each end of the main line, synchronously-actuated circuit-completing devices which traverse said tables of contacts, printing-instruments connected with one or more corresponding contacts at the stations, a relay interposed between the tables of contacts and said printing-instruments, said printers consisting of the combination of transmitting-keys, their local circuits or branches of a circuit, the sunflower device, a magnet in the local circuit for interrupting the main line when one of the keys is operated, local circuits or a split local circuit which is made and broken by the interruptions of the main line, the actuating-magnet included in one of said local circuits or branches, a print-magnet included in the other of said local circuits or branches, a lazy device or tardy circuit-completer for completing the print-magnet circuit, and mechanism and connections, substantially such as described, whereby the impulses received over the line are made effective to energize the actuating devices when the relay-armature leaves its back-stop.

7. The combination, substantially as set forth, of a single main line, Morse instruments at each station connected in corresponding branches of the main line, step-by-step printing apparatus at each station also connected in corresponding branch lines, and circuit apportioning or distributing devices at each end of the main line by which the main-line circuit is successively completed between each pair of corresponding instruments, whereby combined Morse and step-by-step printing-transmission is accomplished over a single main line.

8. The combination, substantially as set forth, of the print-magnet circuit and the tardy circuit-completer, consisting of a cup containing mercury and some other suitable fluid, and a circuit-completing plunger carrying a float.

9. The combination, substantially as set forth, of the type-wheel, the print-magnet, its armature, the paper-carrying frame moving with the armature of the print-magnet, the paper-feeding devices, and a wiper carried by the armature of the print-magnet for drawing slack from the paper-roll at each actuation of the armature.

In testimony whereof we have hereunto subscribed our names.

PATRICK B. DELANY.
EDWD. A. CALAHAN.

Witnesses:
GEO. MERRIMAN,
R. O. MORSE.